(12) United States Patent
Ikenoue (10) Patent No.: US 11,961,450 B2
(45) Date of Patent: Apr. 16, 2024

(54) DISPLAY CONTROLLER, HEAD-MOUNTED DISPLAY, AND IMAGE DISPLAYING METHOD

(71) Applicant: Sony Interactive Entertainment Inc., Tokyo (JP)

(72) Inventor: Shoichi Ikenoue, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/788,112

(22) PCT Filed: Sep. 28, 2020

(86) PCT No.: PCT/JP2020/036724
§ 371 (c)(1),
(2) Date: Jun. 22, 2022

(87) PCT Pub. No.: WO2021/140711
PCT Pub. Date: Jul. 15, 2021

(65) Prior Publication Data
US 2023/0042926 A1    Feb. 9, 2023

(30) Foreign Application Priority Data

Jan. 9, 2020 (JP) .................................. 2020-002298
Jan. 9, 2020 (JP) .................................. 2020-002299

(51) Int. Cl.
*G09G 5/00* (2006.01)
*G09G 3/20* (2006.01)

(52) U.S. Cl.
CPC ... *G09G 3/2096* (2013.01); *G09G 2320/0626* (2013.01); *G09G 2320/0666* (2013.01); *G09G 2354/00* (2013.01); *G09G 2360/16* (2013.01)

(58) Field of Classification Search
CPC ........ G02B 27/01; G02B 27/017; G09G 5/00; G09G 2320/0242; G09G 2320/0626;
(Continued)

(56) References Cited

U.S. PATENT DOCUMENTS 5,987,167 A    11/1999    Inoue
6,618,042 B1    9/2003    Powell
(Continued)

FOREIGN PATENT DOCUMENTS

JP    09271036 A    10/1997
JP    11261923 A    9/1999
(Continued)

OTHER PUBLICATIONS

International Search Report for corresponding PCT Application No. PCT/JP2020/036724, 6 pages, dated Nov. 24, 2020.
(Continued)

*Primary Examiner* — Joe H Cheng
(74) *Attorney, Agent, or Firm* — Matthew B. Dernier, Esq.

(57) ABSTRACT

In a display controller, a standard information acquisition unit acquires at least one of a luminance characteristic and a color gamut of a standard display panel. A luminance information storage unit of an output adjustment unit stores a measurement value of a luminance characteristic of a panel of a displaying destination. A luminance range adjustment unit gradually adjusts a luminance range for an image to be a luminance range same as that of the standard display panel. A color gamut information storage unit stores a measurement value of a color gamut of the panel of the displaying destination. A color adjustment unit adjusts a pixel value of an image on the basis of the color gamut such that the image is displayed in a color same as that on the standard display panel.

22 Claims, 6 Drawing Sheets

(58) Field of Classification Search
CPC ..... G09G 2320/0646; G09G 2320/066; G09G 2320/0666; G09G 2320/0673; G09G 2340/06; G09G 2360/145; G09G 2360/16; G06F 3/147
See application file for complete search history.

(56) References Cited

U.S. PATENT DOCUMENTS

| | | | |
|---|---|---|---|
| 9,697,610 B2* | 7/2017 | Ikenoue | A63F 13/655 |
| 2003/0193472 A1 | 10/2003 | Powell | |
| 2010/0195903 A1* | 8/2010 | Tani | G06V 20/693 |
| | | | 382/162 |
| 2015/0009246 A1* | 1/2015 | Watanabe | G09G 3/3607 |
| | | | 345/102 |
| 2015/0015597 A1* | 1/2015 | Sano | H04N 1/6058 |
| | | | 345/590 |
| 2015/0043812 A1* | 2/2015 | Yano | G06T 7/90 |
| | | | 382/164 |
| 2015/0067511 A1* | 3/2015 | Lee | G06F 3/165 |
| | | | 715/716 |
| 2015/0138224 A1* | 5/2015 | Kim | G09G 3/38 |
| | | | 345/592 |
| 2015/0168723 A1 | 6/2015 | Eto | |
| 2015/0187277 A1* | 7/2015 | Maeyama | G09G 3/3225 |
| | | | 345/694 |
| 2017/0110070 A1* | 4/2017 | Ikeda | G09G 3/36 |
| 2017/0229099 A1* | 8/2017 | Mito | G09G 5/10 |
| 2018/0025700 A1* | 1/2018 | Suzuki | G09G 5/02 |
| | | | 345/589 |
| 2018/0139429 A1 | 5/2018 | Park | |
| 2022/0101803 A1* | 3/2022 | Ohba | H04N 5/64 |

FOREIGN PATENT DOCUMENTS

| | | | |
|---|---|---|---|
| JP | 2001184046 A | | 7/2001 |
| JP | 2002135607 A | | 5/2002 |
| JP | 2003241732 A | | 8/2003 |
| JP | 2004282599 A | | 10/2004 |
| JP | 2008227958 A | * | 9/2008 |
| JP | 2008242134 A | * | 10/2008 |
| JP | 2013187794 A | * | 9/2013 |
| JP | 2013257457 A | | 12/2013 |
| JP | 2015192419 A | | 11/2015 |
| WO | 2019046215 A1 | | 3/2019 |

OTHER PUBLICATIONS

Extended European Search Report for corresponding EP Application No. 20911830.6, 15 pages, dated Jan. 4, 2024.

* cited by examiner

DISPLAY CONTROLLER, HEAD-MOUNTED DISPLAY, AND IMAGE DISPLAYING METHOD

CROSS REFERENCE TO RELATED APPLICATIONS

This is a national phase application of International Application No. PCT/JP2020/036724, filed Sep. 28, 2020, which claims priority to Japanese Application No. JP 2020-002298, filed Jan. 9, 2020 and Japanese Application No. JP 2020-002299, filed Jan. 9, 2020, the entire disclosures of which are hereby incorporated by reference.

TECHNICAL FIELD

The present invention relates to a display controller that outputs image data to a display panel, a head-mounted display that includes the display controller, and an image displaying method.

BACKGROUND ART

Conventionally, various technologies for improving the image quality in video display as in television broadcasting or distributed moving images have been developed. In recent years, in addition to technologies for improving the resolution and the color gamut, technologies for processing signals of the high dynamic range (HDR) in which the range of luminance is expanded are becoming popular. Since the HDR has a luminance tolerance of approximately 100 times in comparison with the conventional standard dynamic range (SDR), an object that may be felt dazzling in the real world, such as reflected light of sunlight, can be represented in a higher degree of reality also on an image. Not only in television broadcasting or distributed moving images but also in the world of computer graphics such as game images, application of the HDR to representation can provide reality to a virtual world.

Meanwhile, a system has become popular which can represent a high-presence image world by detecting movement of the head of a user wearing a head-mounted display and representing a space of a display target with a field of view corresponding to the movement of the head of the user. Also, a walk-through system has been developed with which, when a user wearing a head-mounted display physically moves, the user can virtually walk around in a space displayed as video. Further, a technology has been proposed which reduces the eye strain of a user caused by watching of an image displayed on a head-mounted display by gradually lowering the color temperature of the displayed image (refer, for example, to PTL 1).

CITATION LIST

Patent Literature

[PTL 1] Japanese Patent Laid-Open No. 2013-257457

SUMMARY

Technical Problems

Conventionally, display panels provided in display devices have subtle individual differences, lot differences, and generation differences in performance thereof due to various factors in a manufacturing stage. Therefore, the quality and the impression of an image to be displayed depend upon the individual display devices, and a user who enjoys a single content on a plurality of display devices may feel uncomfortable, or there may be partiality in video experience among users depending upon the display devices owned by the respective users. Such problems are liable to be apparent if it is attempted to improve the resolution, color gamut, luminance range, or the like to allow an image having higher definition and higher presence to be displayed as described above.

The present invention has been made in view of such problems as described above, and it is an object of the present invention to provide a technology that suppresses the influence of individual differences of display panels on a display image.

Solution to Problem

A certain aspect of the present invention relates to a display controller. The display controller is a display controller that controls data of an image to be outputted to a display panel and includes a luminance information storage unit that stores a measurement value of a luminance characteristic of the display panel, a standard information acquisition unit that acquires a luminance characteristic of a standard display panel, a luminance range adjustment unit that gradually changes a luminance range for the image on the basis of the measurement value such that the image is displayed within a luminance range of the standard display panel, and an outputting unit that outputs data of the image whose luminance range has been adjusted.

Another aspect of the present invention relates to a head-mounted display. The head-mounted display includes the display controller described above and a display panel that displays an image whose data is controlled by the display controller.

A further aspect of the present invention relates to an image displaying method. The image displaying method is executed by a display controller that controls data of an image to be outputted to a display panel, and includes a step of reading out a measurement value of a luminance characteristic of the display panel from a memory in which the measurement value is stored, a step of acquiring a luminance characteristic of a standard display panel, a step of gradually changing a luminance range for the image on the basis of the measurement value such that the image is displayed within a luminance range of the standard display panel, and a step of outputting data of the image whose luminance range has been adjusted.

A still further aspect of the present invention relates to a display controller. The display controller is a display controller that controls data of an image to be outputted to a display panel and includes a color gamut information storage unit that stores a measurement value relating to a color gamut of the display panel, a standard information acquisition unit that acquires information relating to a color gamut of a standard display panel, a color adjustment unit that adjusts a pixel value of the image on the basis of the measurement value such that a color displayed on the standard display panel is displayed, and an outputting unit that outputs data of the image whose pixel value has been adjusted.

A yet further aspect of the present invention relates to a head-mounted display. The head-mounted display includes the display controller described above and a display panel that displays an image whose data is controlled by the display controller.

A yet further aspect of the present invention relates to an image displaying method. The image displaying method is executed by a display controller that controls data of an image to be outputted to a display panel, and includes a step of reading out a measurement value relating to a color gamut of the display panel from a memory in which the measurement value is stored, a step of acquiring information relating to a color gamut of a standard display panel, a step of adjusting a pixel value of the image on the basis of the measurement value such that a color displayed on the standard display panel is displayed, and a step of outputting data of the image whose pixel value has been adjusted.

It is to be noted that any combinations of the constituent elements described above and representations of the present invention converted between a method, a device, a system, a computer program, a recording medium on which the computer program is recorded, and so forth are also effective as modes of the present invention.

Advantageous Effect of Invention

According to the present invention, the influence of individual differences of display panels on a display image can be suppressed.

DESCRIPTION OF EMBODIMENT

The present embodiment is based on that at least one of the luminance range and the color of an image visually recognized by a user by light emission of elements provided on a display panel is adjusted according to a predetermined standard or to a display panel that performs displaying according to the standard. Only in this case, the type and the display method of a display device to which the present embodiment can be applied are not restricted specifically, and the display device may be any of general television receivers, various monitors, displays of portable terminals, and so forth. However, the following description is given taking a head-mounted display as an example of the display device.

Figure 1:
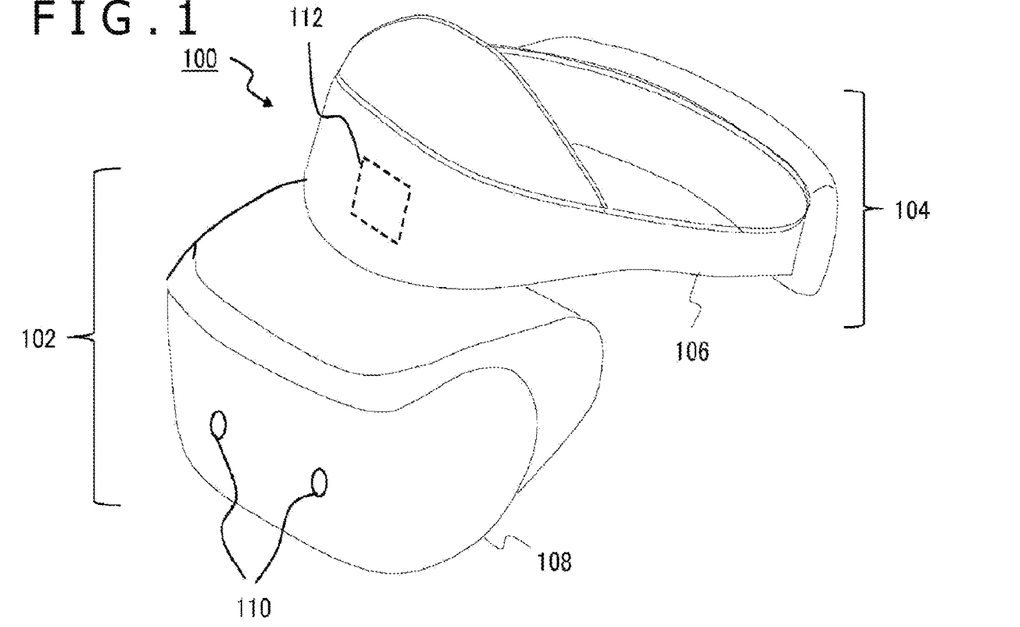
FIG. 1 is a view depicting an example of an appearance of a head-mounted display to which an embodiment can be applied.

FIG. 1 depicts an example of an appearance of a head-mounted display 100 to which the present embodiment can be applied. In this example, the head-mounted display 100 includes an outputting mechanism unit 102 and a mounting mechanism unit 104. The mounting mechanism unit 104 includes a mounting band 106 that goes, when the head-mounted display 100 is worn by a user, around the head of the user to implement fixation of the device. The outputting mechanism unit 102 includes a housing 108 shaped such that it covers the left and right eyes of the user in a state in which the head-mounted display 100 is worn by the user, and includes, in the inside of the housing 108, a display panel disposed such that it faces the eyes of the user when the head-mounted display 100 is worn.

The housing 108 further includes, in the inside thereof, eyepieces that are positioned, when the head-mounted display 100 is worn, between the display panel and the eyes of the user and that enlarges an image to be seen by the user. The head-mounted display 100 may further include speakers or earphones at positions that correspond to the ears of the user when it is worn. Further, the head-mounted display 100 has built therein motion sensors such as an acceleration sensor, a gyro sensor, and a geomagnetic sensor, so that the posture and the motion of the head of the user wearing the head-mounted display 100 are measured.

The head-mounted display 100 further includes a stereo camera 110 on a front face of the housing 108 such that a moving image of the surrounding real space is captured with a field of view corresponding to the orientation of the face of the user. In a certain mode, the head-mounted display 100 immediately displays a moving image captured by the stereo camera 110 to provide a see-through mode in which a state of the real space in a direction in which the user's face is directed is displayed as it is. The head-mounted display 100 may further acquire the position and the posture of the head of the user by analyzing an image captured by the stereo camera 110. Information of the position and the posture of the head of the user, which is obtained from measurement values of the motion sensors or a captured image, can be used for determination of the field of view of an image to be displayed on the head-mounted display 100 or for determination of details of changes in the display world.

The head-mounted display 100 of the present embodiment further includes a mounting sensor 112 that detects that the head-mounted display 100 is worn by a user. The mounting sensor 112 may be a general contact sensor and is provided at a location in the head-mounted display 100 at which it is contacted by the user in a state in which the head-mounted display 100 is worn by the user, so that wearing and removal of the head-mounted display 100 by the user are detected. While it is depicted in FIG. 1 that one mounting sensor 112 is provided at a position in the head-mounted display 100 to be contacted by the forehead of a user, the position and the number of such mounting sensors 112 are not restricted to those depicted.

Figure 2:
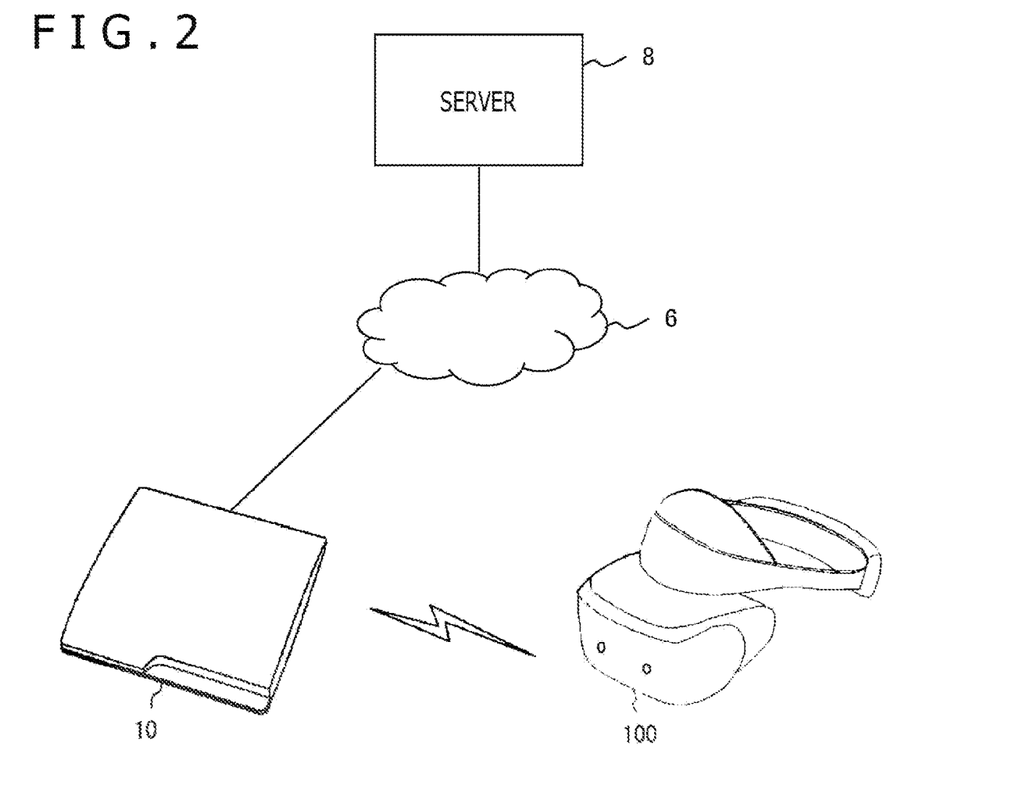
FIG. 2 is a view depicting an example of a configuration of a content processing system to which the present embodiment can be applied.

FIG. 2 depicts an example of a configuration of a content processing system to which the present embodiment can be applied. The head-mounted display 100 is connected to a content processing device 10 by wireless communication or by an interface for connection with peripheral equipment, such as the universal serial bus (USB) Type-C. The content processing device 10 can be connected to a server 8 via a network 6 such as the Internet. The content processing device 10 processes a content, generates data of an image and sound, and transmits the data to the head-mounted display 100.

For example, the content processing device 10 causes an electronic game designated by a user to progress according to a user operation, and draws and outputs data of a screen image of the electronic game at a predetermined rate. Alternatively, the content processing device 10 may acquire a moving image streaming-transferred from the server 8 via the network 6 or read out data of a moving image stored in a recording medium, and may sequentially decode and output the acquired moving image or the read data.

At this time, the content processing device 10 acquires information of the position and the posture of the head-mounted display 100 at a predetermined rate from the head-mounted display 100, specifies the position of the visual point and the direction of the line of sight of the user on the basis of the acquired information, and then generates and transmits a display image with a corresponding field of view. It is to be noted that part or all of functions of the content processing device 10 may be incorporated in the head-mounted display 100.

The server 8 basically provides the content processing device 10 with content data such as an application for executing a game and a moving image. The server 8 in the present embodiment further provides a standard value to be used for control of the display panel of the head-mounted display 100. In particular, the server 8 provides a standard common to a plurality of content processing devices 10 that are connected via the server 8 such that an image is displayed with a similar luminance and a similar color without depending upon the individual head-mounted displays 100 connected to the respective content processing devices 10. It is to be noted that the server 8 that provides a standard value to be used for control of the display panel may be different from a server that provides a game application or content data.

Figure 3:
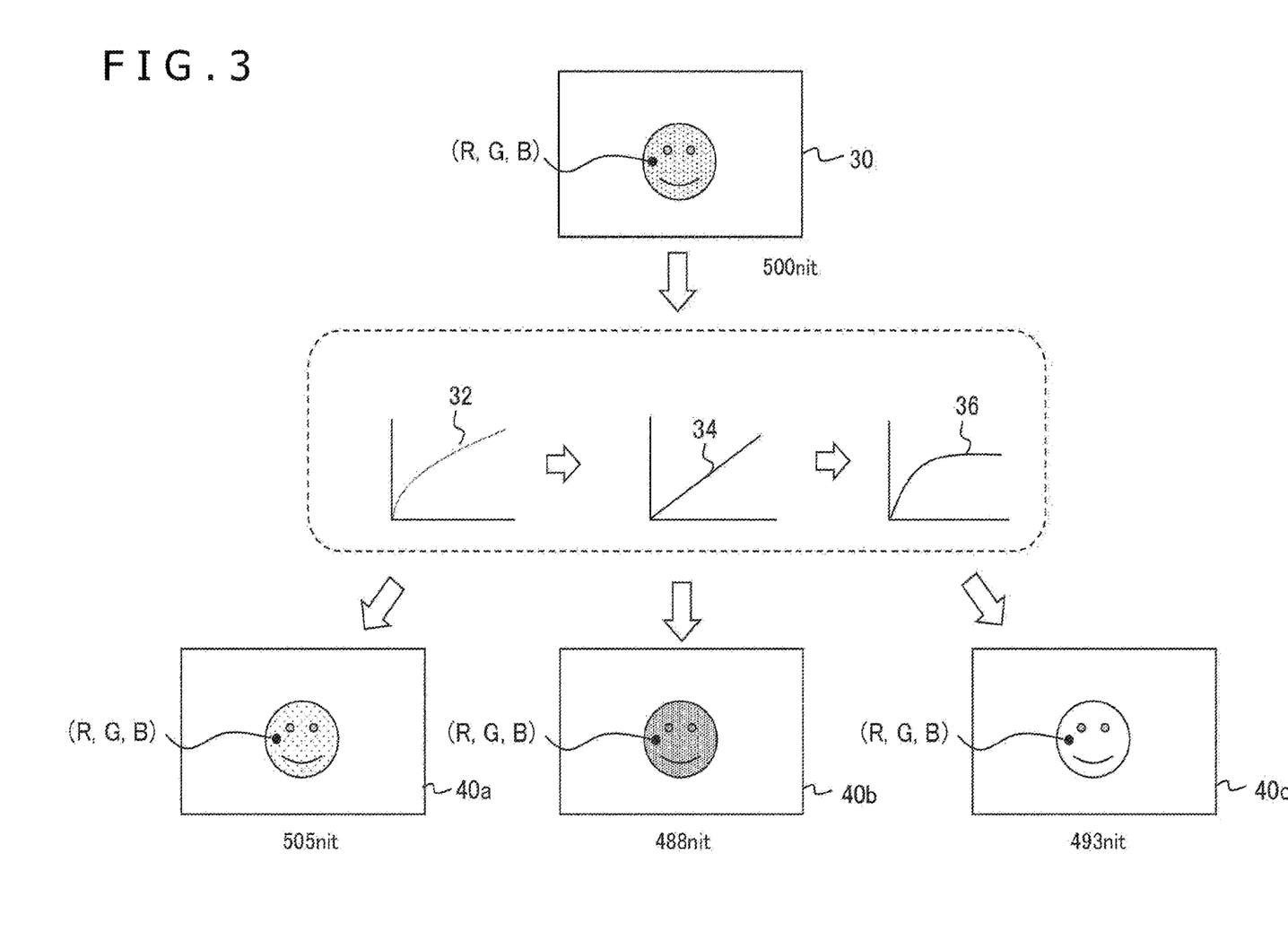
FIG. 3 is a view illustrating a concept of a standard value used in display control in the present embodiment.

FIG. 3 is a view illustrating a concept of the standard value used for display control in the present embodiment. First, a creator of a content determines a luminance and a color in an image of the content by using a display device owned by the creator and generates an image 30 that represents a luminance of each of primary colors (red, green, and blue) for each pixel, for example, as a 16-bit floating point number. The data of the image are quantized using an optical-electro transfer function (OETF) 32, and stored or transmitted as an electric signal of 10 bits or the like.

The head-mounted display 100 that has received the signal via the content processing device 10 dequantizes the electric signal into a linear luminance 34 by using an electro-optical transfer function (EOTF). Then, the head-mounted display 100 uses a tone curve 36 to perform tone mapping of putting a luminance range for the image within a luminance range capable of being outputted from the display panel. Typically, the tone curve 36 implements such conversion as to suppress the gradation more as going from a low luminance region toward the high luminance side, taking human visual characteristics into consideration.

The head-mounted display 100 further converts the value of the luminance of each primary color after the conversion, into a voltage by using a function according to a luminance characteristic of the display panel, and drives the display panel with the voltage to display an image. It is possible that, even if the display panel is driven with the same voltage obtained by the same conversion process in this manner, images 40a, 40b, and 40c that are actually displayed may be different in luminance or color depending upon the head-mounted displays 100 that display the respective images.

For example, if, while the maximum luminance of a display device used by a content creator is 500 nit, the maximum luminances of the head-mounted displays 100 of end users that display the images 40a, 40b, and 40c are 505 nit, 488 nit, and 493 nit, respectively, then the images displayed may be brighter or darker than the original image 30.

Here, the "maximum luminance" may be a peak luminance that is a luminance obtained when a light emitting element is driven to emit light in the maximum or may be the maximum luminance that is obtained when the peak luminance is adjusted in a reducing direction according to a luminance distribution of an image or the like. Although, in the case of a display device that is totally different in specifications, the difference in maximum luminance becomes a correction target in the tone curve 36 or in a later voltage conversion process, individual differences and so forth upon manufacture do not appear in the specifications, and therefore, are liable to go outside the range of correction.

Further, even if the same voltage is applied, if the balance in luminance of the primary colors is different depending upon a display panel, then the displayed color also varies. For example, on the display device of the content creator, pixel values (R, G, B) of the original image 30 are set. Even if the display panels of the head-mounted displays 100 of end users are driven with the same voltages corresponding to the pixel values, a difference possibly occurs in colors of the same pixels in the images 40a, 40b, and 40c. Also in this case, the difference is less likely to be corrected by the conventional procedure for luminance conversion.

Therefore, in the present embodiment, a standard is provided for a luminance characteristic such as a maximum luminance and a color gamut such that a plurality of head-mounted displays 100 seem as if they have characteristics of the maximum luminance and the color gamut. In particular, the luminance characteristic and the color gamut of each head-mounted display 100 are actually measured, and pixel values (luminances of the primary colors) of a display image are converted in such a manner as to eliminate the differences from the standards. This makes it possible for the plurality of head-mounted displays 100 to display images that are same in luminance range and color tone. It is to be noted that either one of or both the adjustment of the luminance range and the adjustment of the color may be performed.

Figure 4:
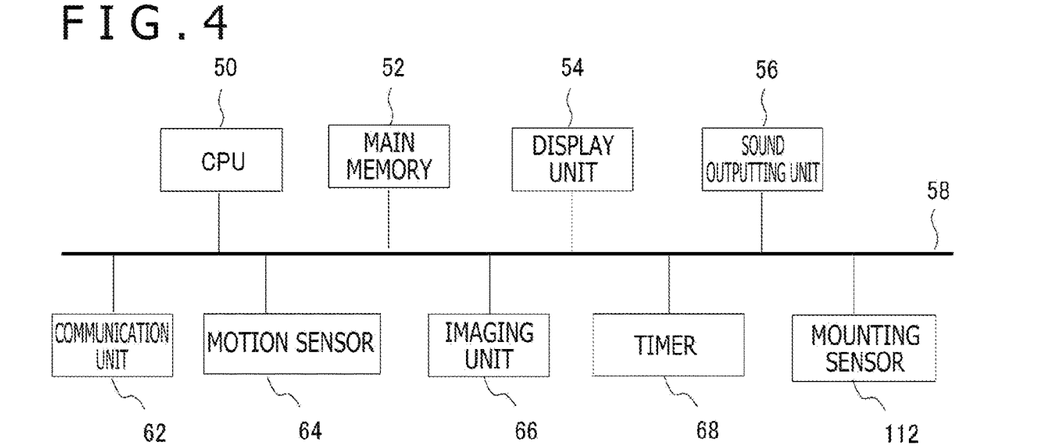
FIG. 4 is a view depicting a configuration of an internal circuit of the head-mounted display in the present embodiment.

FIG. 4 depicts a configuration of an internal circuit of the head-mounted display 100. The head-mounted display 100 includes a central processing unit (CPU) 50, a main memory 52, a display unit 54, a sound outputting unit 56, a communication unit 62, a motion sensor 64, an imaging unit 66, a timer 68, and a mounting sensor 112. The components mentioned above are connected to one another by a bus 58. The CPU 50 processes information acquired from the components of the head-mounted display 100 through the bus 58 and provides the display unit 54 and the sound outputting unit 56 with output data. The main memory 52 stores therein a program and data necessary for processing by the CPU 50.

The display unit 54 includes a display panel, such as a liquid crystal panel or an organic electroluminescence (EL) panel, and a driving mechanism for the display panel and displays an image in front of the eyes of a user who wears the head-mounted display 100. A pair of parallax images may be displayed in regions corresponding to the left and right eyes to implement stereoscopic vision. The sound outputting unit 56 includes speakers or earphones provided at positions that correspond to the ears of the user when the user wears the head-mounted display 100 and a control mechanism for the speakers or the earphones, and generates sound to be heard by the user.

The communication unit 62 establishes communication with the content processing device 10 and transmits and receives necessary data. The motion sensor 64 includes at least one of an acceleration sensor, a gyro sensor, a geomagnetic sensor, and the like and measures the posture and the movement of the head-mounted display 100 in a three-dimensional space. The imaging unit 66 includes the stereo camera 110, images the actual space at a predetermined rate, and performs a suitable correction process to output a captured image. The timer 68 measures a period of time elapsed from start of adjustment in adjustment of the luminance range. The mounting sensor 112 detects wearing and removal of the head-mounted display 100 by the user as described hereinabove.

Figure 5:
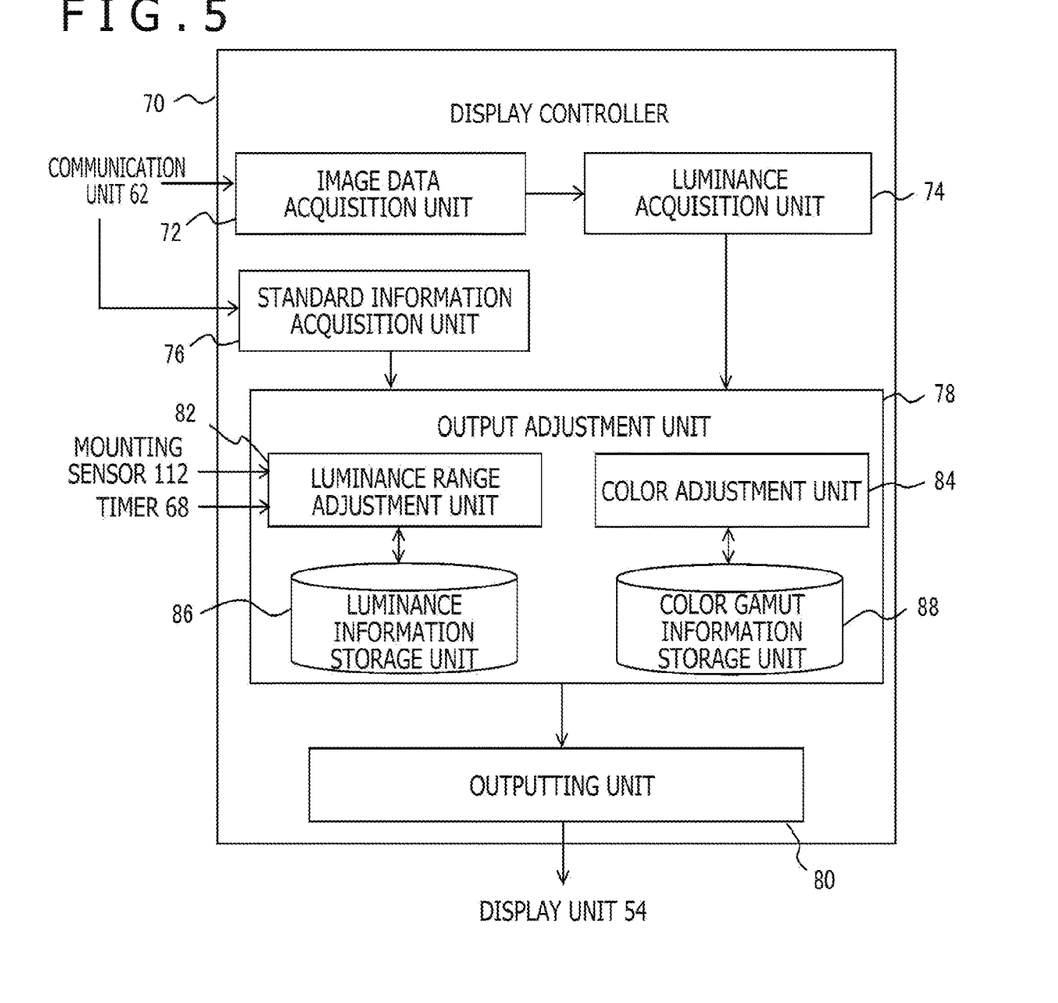
FIG. 5 is a view depicting a configuration of functional blocks of a display controller built in the head-mounted display in the present embodiment.

FIG. 5 depicts a configuration of functional blocks of a display controller 70 built in the head-mounted display 100. The functional blocks depicted in FIG. 5 can be implemented in terms of hardware by the CPU 50 and the main memory 52 depicted in FIG. 4, control circuits for the respective mechanisms, and so forth and can be implemented in terms of software by programs that are loaded into the main memory 52 from a recording medium or the like and that demonstrate various functions such as a data inputting function, a data retaining function, a data processing function, and a communication function. Accordingly, it is recognized by those skilled in the art that the functional blocks mentioned above can be implemented in various forms by hardware only, by software only, or by a combination of them and are not limited to any of them.

The display controller 70 includes an image data acquisition unit 72 that acquires data of an image, a luminance acquisition unit 74 that converts a pixel value into a luminance, a standard information acquisition unit 76 that acquires standard information of a maximum luminance and a color gamut, an output adjustment unit 78 that adjusts a pixel value in such a manner that an image that meets the standard is displayed, and an outputting unit 80 that outputs image data that has been adjusted. The image data acquisition unit 72 acquires data of an image from the content processing device 10 via the communication unit 62. This data is obtained by quantizing luminances of the three primary colors represented by pixels of an original image by the OETF.

The luminance acquisition unit 74 converts pixel values of an image acquired by the image data acquisition unit 72 into luminances by the EOTF. The standard information acquisition unit 76 acquires standard values of at least one of a luminance characteristic and a color gamut. It is to be noted that, while the description given below exemplifies a case in which a maximum luminance is used as the luminance characteristic, the parameter on which the adjustment of the luminance range is based is not limited to the maximum luminance and may be, for example, a table or a tone curve that represents a relation between the set value of the luminance and the measurement values of the emitted light luminance including an intermediate luminance range.

In a case where a standard value for a maximum luminance is to be acquired, the standard information acquisition unit 76 acquires a measurement value of the luminance that is obtained, for example, when a maximum voltage is applied to a display panel that is used as a standard. Here, the "display panel that is used as a standard" is, for example, such a display panel as described below.

1. Display panel that indicates the lowest measurement value of the maximum luminance among products that have been shipped thus far
2. Display panel used in creation of a content by a content creator By adopting 1 above, the luminance ranges of a plurality of head-mounted displays 100 can readily be made coincide with each other in a direction in which the display luminance is lowered. By adopting 2 above, an image intended by the content creator can be displayed similarly on a plurality of head-mounted displays 100. It is to be noted that 1 and 2 above are not necessarily exclusion conditions relative to each other. In other words, if a display device on which adjustment of the luminance range according to the present embodiment is performed in such a manner as to become appropriate for a display panel whose maximum luminance has been the lowest is used by the content creator, then the standards of 1 and 2 above become same as each other.

In place of using a particular display panel as a standard, a maximum luminance may be set numerically. For example, the standard information acquisition unit 76 may acquire an average value or a median of maximum luminances of display panels having been shipped thus far, as a standard value. Where a standard value for a color gamut is to be acquired, the luminance acquisition unit 74 acquires measurement values of chromaticity, for example, at the time when the three primary colors and a standard white color are individually displayed on the display panel that is used as a standard.

The "display panel that is used as a standard" in this case is, for example, such a display panel as described below.

1. Display panel that indicates the narrowest color gamut among products that have been shipped thus far
2. Display panel used in creation of a content by a content creator.

Also in this case, the standards of 1 and 2 may become same as each other, similarly to the case of the maximum luminance. Alternatively, the standard value may be set numerically.

As described above, the standard information acquisition unit 76 may acquire both of the standard values for a maximum luminance and a color gamut. The standard information acquisition unit 76 basically stores in advance the standard values in an internal memory thereof. However, display panels continue to be manufactured thereafter, and it is possible that the standard values change in some cases as a result of a minor change in function, generation transition, or the like. Further, the content creator may change the display panel that is used for creation of a content.

Therefore, the standard information acquisition unit 76 acquires the latest standard values as needed from the server 8 via the communication unit 62 and the network 6 and updates the data stored in the memory. In a case where a standard value depends upon a content, the standard information acquisition unit 76 stores standard values in association with contents into the memory. The standard information acquisition unit 76 supplies the output adjustment unit 78 with the acquired latest information of the standard values. Where the standard values are different for different contents, the standard information acquisition unit 76 supplies the standard values associated with the content of the processing target.

The output adjustment unit 78 adjusts the luminances of the three primary colors that are pixel values of a display image on the basis of the standard values supplied from the standard information acquisition unit 76 and corresponding parameters measured in regard to the display panel of the image outputting destination. In particular, the output adjustment unit 78 includes a luminance range adjustment unit 82 that adjusts the luminance range for an image, a luminance information storage unit 86 that stores measurement values of the maximum luminance of the display panel, a color adjustment unit 84 that adjusts the color of an image, and a color gamut information storage unit 88 that stores measurement values of the color gamut of the display panel.

The luminance information storage unit 86 stores a maximum luminance of the display panel measured by a luminance meter, for example, at the time of shipment of the display panel or the head-mounted display. While the maximum luminance may be a peak luminance or a luminance obtained by adjusting the peak luminance as described hereinabove, a parameter same as the maximum luminance acquired by the standard information acquisition unit 76 is applied. The luminance range adjustment unit 82 reads out the measurement values of the maximum luminance of the panel of the displaying destination from the luminance information storage unit 86 and adjusts the luminance range for the display image in such a manner that the difference of the measurement values from the standard values is eliminated.

In other words, the luminance range adjustment unit 82 changes the luminance range for a display image on the basis of the measurement values in such a manner that the display image is displayed within the luminance range of the standard display panel. Most simply, all of the pixel values are multiplied by a ratio of the measurement value to the standard value of the maximum luminance, to adjust the luminance of the overall image with the same ratio. As an alternative, when the standard value of the maximum luminance is lower than the measurement value of the display panel, such adjustment as to lower only those luminances that are higher than the standard value down to the standard value may be performed. As another alternative, the tone curve may be changed in such a manner that the maximum value of the luminance after tone mapping becomes the standard value.

Here, the luminance range adjustment unit 82 may utilize adaptation to brightness and darkness of the human visual sense such that the user does not notice the adjustment of the luminance. The adaptation to brightness and darkness is a physiological reaction in which an object that has become difficult to see due to a rapid change in intensity of light incident on the eyeballs gradually becomes visible in an appropriate manner owing to sensitivity adjustment of the retina. The luminance range adjustment unit 82 starts the adjustment of the luminance range at a timing at which the change in intensity of light incident on the eyeballs exceeds a predetermined criterion, and gradually changes the luminance range before the adaptation is completed, that is, within a period within which the eyesight is poor.

Consequently, within a period within which the adjustment of the luminance range is not necessary, even if the head-mounted display 100 first causes a user to visually recognize an image on which the performance the head-mounted display 100 originally has is demonstrated in the maximum and then applies adjustment as occasion demands, this is less likely to be noticed by the user. This similarly applies to a case in which the adjustment is cancelled in midstream. In the case of a head-mounted display, since the ambient light is blocked at a point of time at which the user wears the head-mounted display, a comparatively great change occurs in intensity of light incident on the eyeballs as a result.

For example, the head-mounted display 100 can be configured such that, where the standard maximum luminance is low, the head-mounted display 100 displays an image within an original wide luminance range at a point of time at which the user wears the head-mounted display 100 and, immediately after that, it gradually reduces the luminance range. By this, it is possible to prevent the user from misunderstanding that the performance of the head-mounted display 100 is poor. In this case, the luminance range adjustment unit 82 acquires the timing at which the user wears the head-mounted display 100 from the mounting sensor 112 and acquires a period of time elapsed from that timing from the timer 68, to thereby gradually change the luminance range with a predetermined changing amount per unit period of time.

Further, the luminance range adjustment unit 82 may switch whether or not to adjust the luminance range, depending upon a scene of a content. For example, in a scene created with high definition in a rigorous manner or a scene in which high frequency components are less and the difference in luminance range is likely to be visually recognized, the luminance range adjustment unit 82 adjusts the luminance range for a display image so as to conform to the standard value. Alternatively, the luminance range adjustment unit 82 may accept a mode switching operation by the user through an inputting device not depicted and switch whether or not to adjust the luminance range depending upon whether or not the accepted operation indicates an adjustment mode.

Also in the cases described above, the luminance range adjustment unit 82 may gradually adjust the luminance range from the point of time at which the intensity of light incident on the eyeballs changes significantly, so that it becomes difficult to recognize the change. For example, the luminance range adjustment unit 82 detects switching between a dark scene and a bright scene and starts adjustment of the luminance range immediately after the detection. In other words, the luminance range adjustment unit 82 acquires a period of time elapsed from the switching of the scene from the timer 68 and gradually changes the luminance range with a predetermined changing amount per unit period of time. In a case where the head-mounted display 100 is of the type in which external light is blocked, since the light incident on the eyeballs depends upon the image to be displayed, adjustment of the luminance range can be performed readily and efficiently according to the timing of deterioration of the eyesight.

The color adjustment unit 84 reads out a measurement value relating to the color gamut of the panel of the displaying destination from the color gamut information storage unit 88 and adjusts pixel values, namely, luminances of the three primary colors, of the display image in such a manner that a change in color due to the difference from the standard color gamut is eliminated. In other words, the color adjustment unit 84 adjusts the pixel values of the display image on the basis of the measurement values in such a manner that a color displayed on the standard display panel is displayed. In particular, the color adjustment unit 84 first converts the values of the luminances (R, G, B) of the three primary colors into values (X, Y, Z) of the XYZ color coordinate system. The XYZ color coordinate system represents an absolute color that does not depend upon a display device. Then, the color adjustment unit 84 determines luminances (R, G, B) of the three primary colors on the panel of the displaying destination for representing the color of (X, Y, Z). The formula for converting pixel values (R, G, B) into those of the XYZ color coordinate system is represented as follows.

[Math. 1]

$$\begin{bmatrix} X \\ Y \\ Z \end{bmatrix} = M \cdot \begin{bmatrix} R \\ G \\ B \end{bmatrix}$$ (Formula 1)

Here, M is a 3×3 conversion matrix and is uniquely determined depending upon the color gamut of the display panel, namely, upon chromaticities of the three primary colors and the standard white color. In a case where (X, Y, Z) of the XYZ color coordinate system are to be converted into luminances (R, G, B) of the three primary colors, naturally, it is sufficient if the inverse matrix of the conversion matrix M is let act on (X, Y, Z). The color gamut information storage unit 88 stores the chromaticities that are measured by a color meter at the time of shipment or the like of the display panel or the head-mounted display and that are obtained when the three primary colors and the standard white color are individually displayed.

Alternatively, the color gamut information storage unit 88 may store therein in advance the conversion matrix M obtained by calculation from those values. It is preferable to perform measurement of the chromaticity at a plurality of locations in the display panel and adopt an average value or a median of the values of the chromaticity while excluding outliers, to thereby suppress the influence of color irregularity and luminance irregularity of the panel. Since, in a general manufacturing process of a display panel, measurement of a color is performed as calibration for correcting color irregularity or luminance irregularity, a result of the measurement may be diverted.

On the other hand, measurement values of the chromaticity obtained when the three primary colors and the standard white color are individually displayed, in a state in which the display panel is controlled such that color irregularity is reduced on the basis of a result of such calibration as described above, may be stored into the color gamut information storage unit 88. Since, during operation of the panel, an image is displayed in a state in which such control is introduced, the color adjustment unit 84 can unify the colors of an image that is actually viewed by the user by adjusting the color using the measurement values on which the control is reflected. Further, in a case where the head-mounted display is of the type in which an image is visually recognized through an eyepiece, light having passed through the eyepiece may be determined as a measurement target. If the standard value to be acquired by the standard information acquisition unit 76 is treated similarly, then the color can be adjusted in a rigorous manner taking the influence of the lens into account.

The outputting unit 80 outputs data of an image obtained as a result of adjustment of pixel values by the output adjustment unit 78 to the display unit 54 including the display panel. In particular, the outputting unit 80 converts linear luminances of the three primary colors obtained by the adjustment into voltages by using a transfer function according to a characteristic of the display unit 54 and then drives the display panel of the display unit 54 with the voltages. In a case where the output adjustment unit 78 does not use tone mapping in the adjustment, the outputting unit 80 suitably performs tone mapping.

Figure 6:
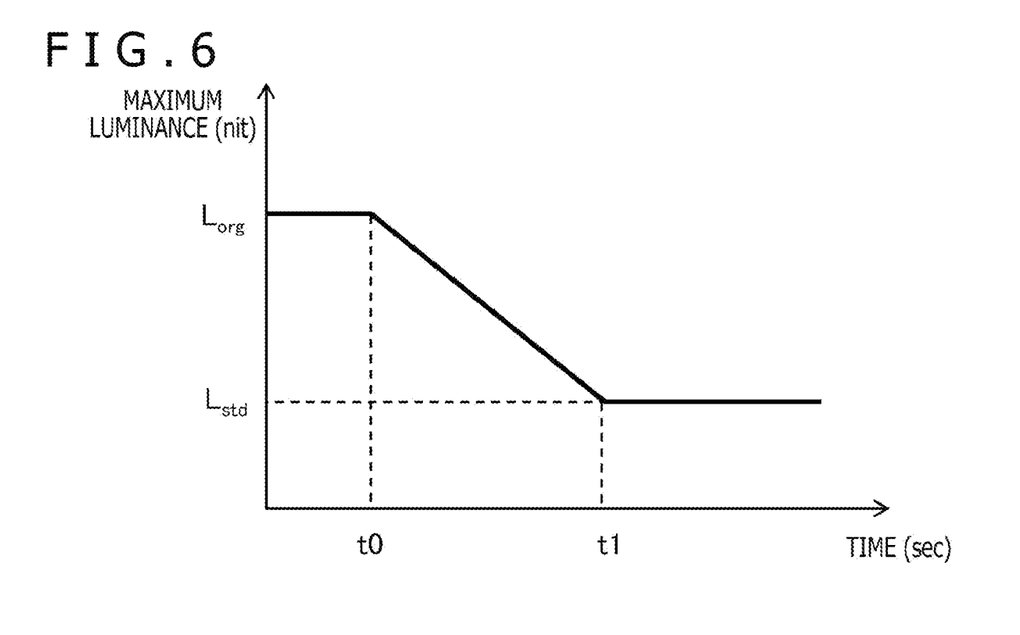
FIG. 6 is a view exemplifying a temporal change of a luminance range adjusted by a luminance range adjustment unit of the present embodiment.

FIG. 6 exemplifies a temporal change of the luminance range that is adjusted by the luminance range adjustment unit 82. In FIG. 6, the axis of ordinate indicates the maximum luminance (nit) and the axis of abscissa indicates the time (sec). Further, while a case is assumed in which the standard maximum luminance $L_{std}$ is lower than the maximum luminance $L_{org}$ of the display panel of the image displaying destination, the present embodiment is not limited to this. Preferably, as described hereinabove, the luminance range adjustment unit 82 gradually changes the luminance range from an adjustment start timing t0 until the range reaches the standard maximum luminance $L_{std}$.

The luminance range adjustment unit 82 basically sets the timing at which the intensity of light incident on the eyeballs of the user changes significantly as the adjustment start timing t0. For example, the luminance range adjustment unit 82 sets the point of time at which the user wears the head-mounted display 100, the point of time at which the head-mounted display 100 starts image display, or the point of time at which the brightness of a scene in a content being displayed changes significantly, as the adjustment start timing t0. For example, the luminance range adjustment unit 82 detects the timing at which the user wears the head-mounted display 100 from a notification from the mounting sensor 112.

Further, the luminance range adjustment unit 82 determines the timing at which the brightness of a scene changes significantly, on the basis of a predetermined condition set in advance. For example, it is set as a condition that an average value or a median of the luminance over an entire image changes by a predetermined threshold value or more from that of a preceding frame. In this case, the luminance range adjustment unit 82 may start a determination process of the timing at which the brightness of a scene changes significantly, on condition that the user wears the head-mounted display 100 or that the user performs switching to an adjustment mode.

For the inclination of the maximum luminance during an adjustment period from t0 to t1, that is, for the adjustment amount per unit period of time, a changing rate of the luminance a person is hard to notice is determined in advance by an experiment or the like. In this case, the adjustment end timing t0 is naturally determined from the difference between the maximum luminance $L_{org}$ of the display panel of the image displaying destination and the standard maximum luminance $L_{std}$. Alternatively, the timing t1 may be determined first from a period of time required for adaptation of a person, and then the inclination of the maximum luminance may be determined such that adjustment is completed within the period from t0 to t1. It is to be noted that the depicted temporal change of the maximum luminance is an example and may be changed in inclination or may be changed in a curved pattern in the middle of adjustment.

Figure 7:
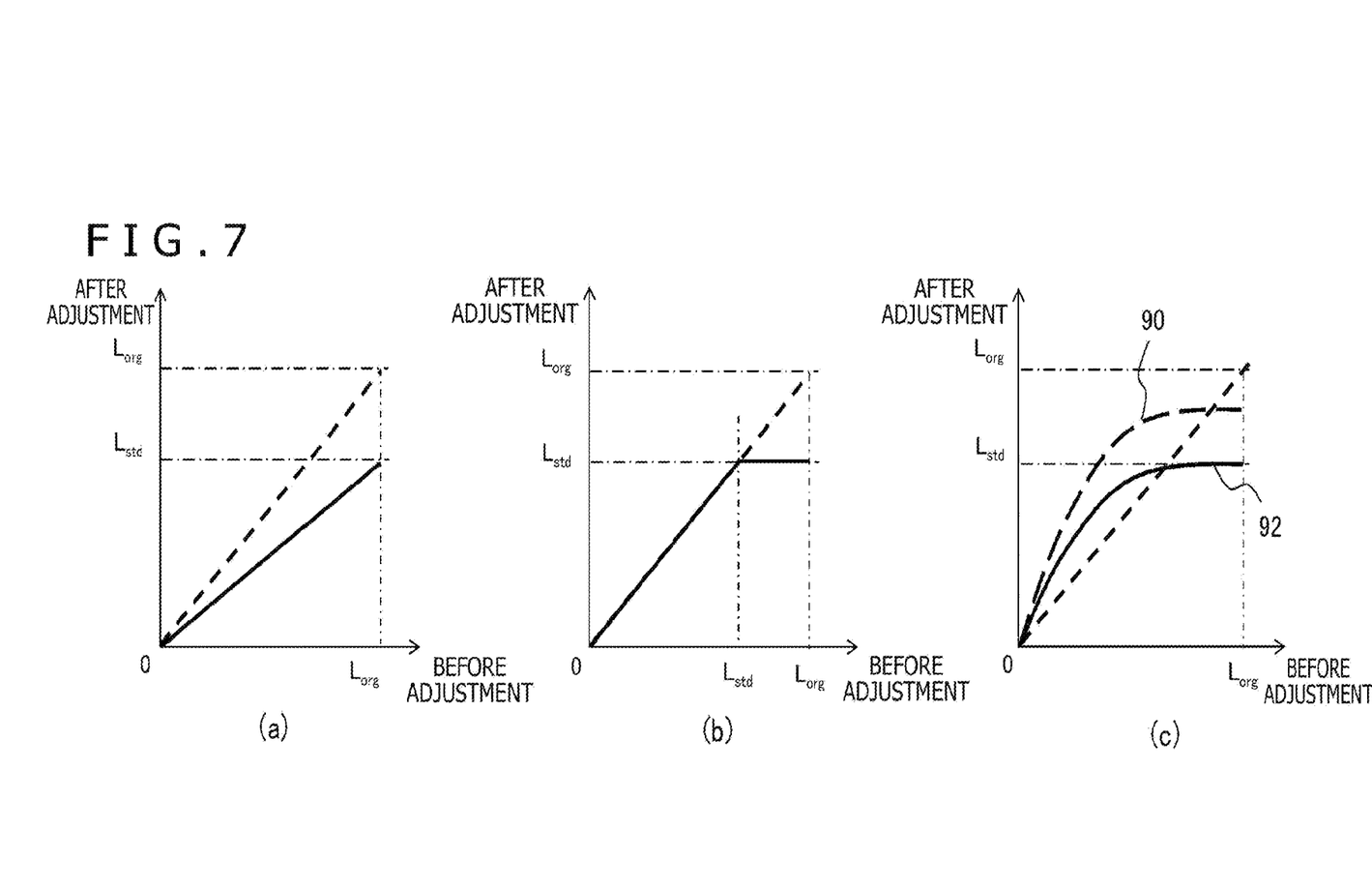
FIG. 7 is a view illustrating examples of technique for adjusting the luminance of each pixel of a display image by the luminance range adjustment unit of the present embodiment.

FIG. 7 is a view illustrating examples of technique executed by the luminance range adjustment unit 82 for adjusting the luminance of each pixel of a display image. In FIG. 7, the axis of abscissa indicates the luminance before adjustment, the axis of ordinate indicates the luminance after adjustment, and a corresponding relation of the luminances is indicated by a solid line. For comparison, a corresponding relation in a case where the luminance is not adjusted, that is, in a case where the luminance does not change before and after adjustment, is also indicated by a broken line. It is to be noted that similar adjustment is actually performed for the three primary colors. (a) indicates an example in which the luminances of all pixels are changed at a ratio equal to that of the change of the maximum luminance. Specifically, the luminance within the range from 0 to the maximum luminance $L_{org}$ is changed linearly within the range from 0 to the standard maximum luminance $L_{std}$.

(b) depicts an example in which, for pixels having a luminance equal to or higher than the standard maximum luminance $L_{std}$ in a display image, the luminance is clamped at the maximum luminance $L_{std}$. In this case, for each pixel having a luminance lower than the maximum luminance $L_{std}$, the original luminance is maintained. (c) depicts an example in which tone mapping is used in adjustment. In particular, the luminance range adjustment unit 82 uses, in place of a tone curve 90 that is used normally, such a tone curve 92 that the maximum luminance is $L_{std}$ to perform tone mapping. The method of (c) allows adjustment of the luminance range simultaneously with tone mapping. In the cases of (a) and (b), after adjustment by the luminance range adjustment unit 82, the outputting unit 80 suitably performs tone mapping as usual.

Figure 8:
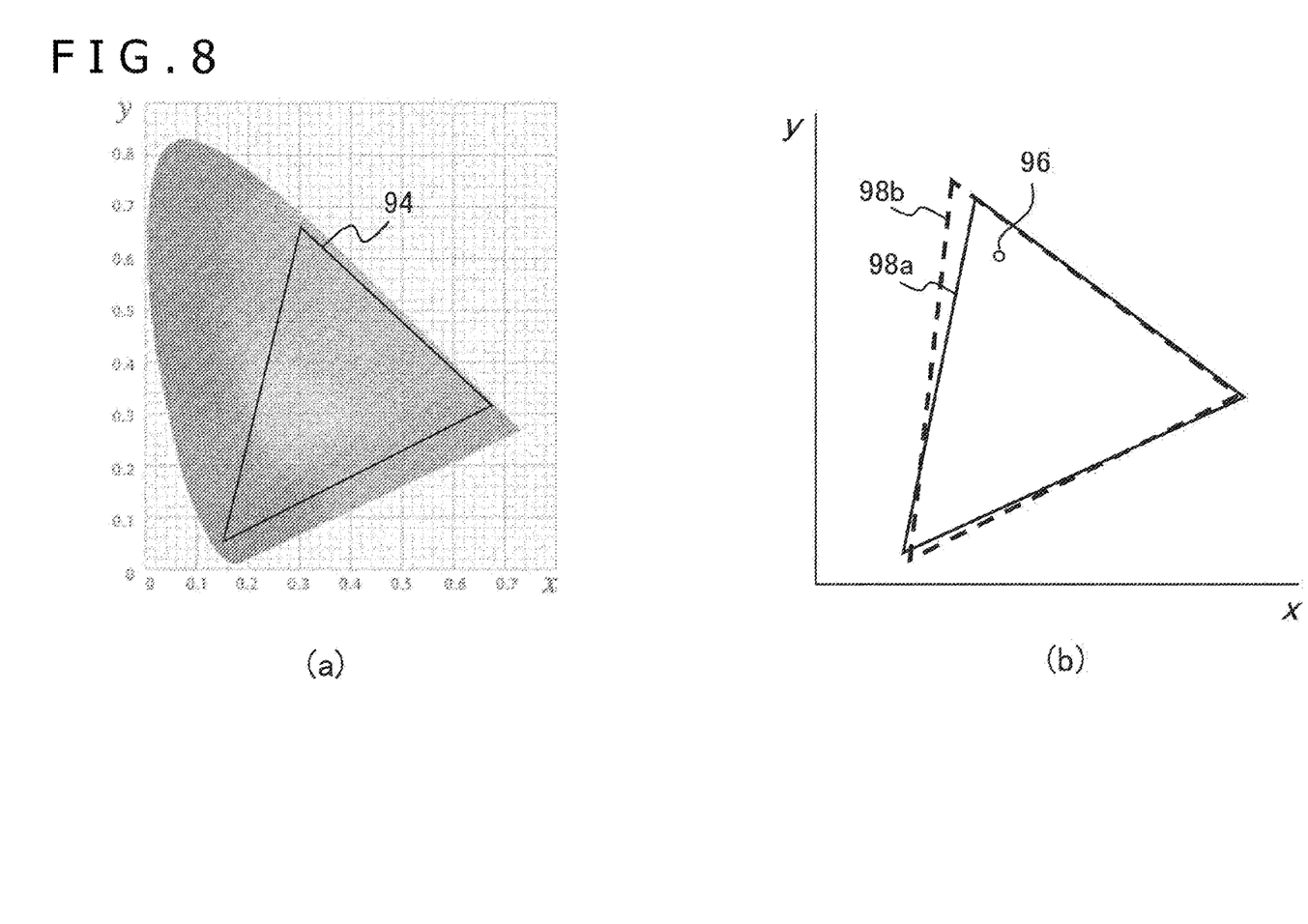
FIG. 8 is a view illustrating a principle of adjustment of colors by a color adjustment unit in the present embodiment.

FIG. 8 is a view illustrating the principle of adjustment of colors by the color adjustment unit 84. (a) depicts the Commission Internationale de l'Eclairage (CIE) chromaticity diagram of the XYZ color coordinate system. While the figure depicts the CIE chromaticity diagram in a gray scale, an absolute chromaticity is determined by xy coordinates where former two when tristimulus values XYZ are represented by ratio are factors. A color gamut 94 that can be displayed by the display panel is defined, for example, in such a manner as depicted in (a) of FIG. 8, within a horseshoe shaped range of the chromaticity.

Although the color gamut is nominally the same on display panels of the same specifications, it sometimes varies slightly due to various factors at the time of manufacture as indicated by a solid line and a broken line in (b). If the color gamut varies, then even with the same chromaticity 96, the combination (R, G, B) in luminance of the three primary colors representing the chromaticity 96 varies depending upon the display panel. This is because (R, G, B) are represented by relative positional relations from the coordinates of the three primary colors that are the apexes of a triangle representing the color gamut. In other words, even in regard to the same pixel values (R, G, B), a difference occurs in absolute chromaticity, resulting in the possibility that they may be represented in a color that depends upon the display panel.

Therefore, the color adjustment unit 84 determines, by calculation, in what manner the colors of RGB represented by a standard color gamut (for example, a color gamut 98a) are represented by RGB in a color gamut of the panel of the displaying destination (for example, a color gamut 98b). In particular, the color adjustment unit 84 converts pixel values of an image into values of the XYZ color coordinate system according to the formula 1 to determine chromaticities (for example, the chromaticity 96) as described hereinabove, and determines values of RGB when the chromaticities are represented on the display panel of the displaying destination by using an inverse matrix of the conversion matrix of the panel. The formula for converting pixel values ($R_{org}$, $G_{org}$, $B_{org}$) of an original image into pixel values ($R_{tgt}$, $G_{tgt}$, $B_{tgt}$) of the panel of the displaying destination is as follows.

[Math. 2]

$$\begin{bmatrix} R_{tgt} \\ G_{tgt} \\ B_{tgt} \end{bmatrix} = M_{tgt}^{-1} \cdot M_{std} \cdot \begin{bmatrix} R_{org} \\ G_{org} \\ B_{org} \end{bmatrix} \quad \text{(Formula 2)}$$

Here, $M_{std}$ is a conversion matrix into the XYZ color coordinate system acquired from the standard color gamut, and $M_{tgt}$ is a conversion matrix into the XYZ color coordinate system acquired from the color gamut of the panel of the displaying destination. By outputting pixel values of an original image to the panel of the displaying destination after they are converted in this manner, the color of an image to be displayed can be unified even if the color gamut varies. It is to be noted that, if similar adjustment is performed including a display device that is used in creation of a content by a creator as described above, then since the color representation is unified with a display device of an end user, the standard color gamut may not be that of an existing display panel.

For example, if a color gamut that is the narrowest among color gamuts of display panels having been shipped thus far is determined as the standard, then the chromaticity of pixel values of RGB defined within the color gamut is included in the color gamut of all display panels. As a result, such a situation can be avoided that the maximum luminances of RGB are exceeded through color adjustment and pixel values are clamped at the maximum luminances.

According to the present embodiment described above, a standard value is set for at least one of the maximum luminance and the color gamut, and the display controller adjusts the luminance range or the color of a display image in such a manner that the difference between the standard values and measurement values of a corresponding parameter of the panel of the displaying designation is eliminated. Consequently, even if individual differences occur among display panels due to various factors at the time of manufacture, the luminance and the color can be unified among a plurality of display devices.

Further, the display controller adjusts the luminance range in a state in which the eyesight of a user is poor after the intensity of light incident on the eyeballs of the user changes significantly until dark-light adaptation is completed. Consequently, even if adjustment is started in the middle of a content, the possibility that the user recognizes the adjustment can be reduced, and natural adjustment can be performed. Further, during a period during which adjustment is not preferable, such as at a timing at which the head-mounted display is worn, this can be taken into account, and both presence and absence of adjustment can be achieved suitably.

Further, the color gamut of a display panel is measured in advance under the control performed actually or in a state in which eyepieces are interposed, and the display controller performs adjustment of the color on the basis of the measured color gamut. Consequently, the color can be matched in terms of the final look. By the configurations described above, whichever display device is used, it is possible, for example, for a high definition image created by a content creator to be visually recognized without spoiling the intention or the world view of it.

The present invention has been described on the basis of the embodiment. The embodiment described above is exemplary, and it can be recognized by those skilled in the art that various modifications are possible in the combination of the components and the processes and that such modifications also fall within the scope of the present invention.

INDUSTRIAL APPLICABILITY

As described above, the present invention can be applied to various kinds of equipment such as a display controller, a content processing device, an information terminal, a portable terminal, a game device, a head-mounted display, a display device, and a television receiver, or a system or the like that includes any of the various kinds of equipment.

REFERENCE SIGNS LIST

10: Content processing device
50: CPU
52: Main memory
54: Display unit
56: Sound outputting unit
62: Communication unit
64: Motion sensor
66: Imaging unit
68: Timer
70: Display controller
72: Image data acquisition unit
74: Luminance acquisition unit
76: Standard information acquisition unit
78: Output adjustment unit
80: Outputting unit
82: Luminance range adjustment unit
84: Color adjustment unit
86: Luminance information storage unit
88: Color gamut information storage unit
100: Head-mounted display
110: Stereo camera
112: Mounting sensor

The invention claimed is:

1. A display controller that controls data of an image to be outputted to a display panel, comprising:
a luminance information storage unit that stores a measurement value of a luminance characteristic of the display panel;
a standard information acquisition unit that acquires a luminance characteristic of a standard display panel;
a luminance range adjustment unit that gradually changes a luminance range for the image on a basis of the measurement value such that the image is displayed within a luminance range of the standard display panel; and
an outputting unit that outputs data of the image whose luminance range has been adjusted,
wherein the standard information acquisition unit at least one of: (i) acquires a luminance characteristic determined on a basis of measurement values of luminance characteristics of a plurality of display panels, as the luminance characteristic of the standard display panel; and (ii) acquires a luminance characteristic of a display panel whose maximum luminance is lowest among a plurality of shipped display panels, as the luminance characteristic of the standard display panel.

2. The display controller according to claim 1, wherein the luminance range adjustment unit starts adjustment of the luminance range for the image at a timing at which a change in intensity of light incident on eyeballs exceeds a predetermined criterion.

3. The display controller according to claim 1, wherein the luminance range adjustment unit detects that a head-mounted display in which the display controller is built is worn by a user, and gradually decreases the luminance range for the image immediately after the detection.

4. The display controller according to claim 1, wherein the luminance range adjustment unit detects that brightness of a scene of a content to be displayed has changed exceeding a predetermined criterion, and gradually decreases the luminance range for the image immediately after the detection.

5. The display controller according to claim 1, wherein the luminance range adjustment unit switches whether or not to adjust the luminance range for the image, according to a scene of a content to be displayed or a mode switching operation made by a user.

6. The display controller according to claim 1, wherein the standard information acquisition unit acquires a luminance characteristic of a display panel used for creation of a content by a content creator, as the luminance characteristic of the standard display panel.

7. The display controller according to claim 1, wherein the standard information acquisition unit acquires the luminance characteristic of the standard display panel from a server through a network to update the luminance characteristic of the standard display panel.

8. A head-mounted display comprising:
a display controller that controls data of an image to be outputted to a display panel and that includes a luminance information storage unit that stores a measurement value of a luminance characteristic of the display panel,
a standard information acquisition unit that acquires a luminance characteristic of a standard display panel,
a luminance range adjustment unit that gradually changes a luminance range for the image on a basis of the measurement value such that the image is displayed within a luminance range of the standard display panel, and
an outputting unit that outputs data of the image whose luminance range has been adjusted; and
the display panel that displays an image whose data is controlled by the display controller,
wherein the standard information acquisition unit at least one of: (i) acquires a luminance characteristic determined on a basis of measurement values of luminance characteristics of a plurality of display panels, as the luminance characteristic of the standard display panel; and (ii) acquires a luminance characteristic of a display panel whose maximum luminance is lowest among a plurality of shipped display panels, as the luminance characteristic of the standard display panel.

9. An image displaying method executed by a display controller that controls data of an image to be outputted to a display panel, the image displaying method comprising:
reading out a measurement value of a luminance characteristic of the display panel from a memory in which the measurement value is stored;
acquiring a luminance characteristic of a standard display panel;
gradually changing a luminance range for the image on a basis of the measurement value such that the image is displayed within a luminance range of the standard display panel; and
outputting data of the image whose luminance range has been adjusted,
wherein the acquiring includes at least one of: (i) acquiring a luminance characteristic determined on a basis of measurement values of luminance characteristics of a plurality of display panels, as the luminance characteristic of the standard display panel; and (ii) acquiring a luminance characteristic of a display panel whose maximum luminance is lowest among a plurality of shipped display panels, as the luminance characteristic of the standard display panel.

10. A non-transitory, computer readable storage medium containing a computer program, which when executed by a computer that controls data of an image to be outputted to a display panel, causes the computer to perform an image displaying method by carrying out actions, comprising:

reading out a measurement value of a luminance characteristic of the display panel from a memory in which the measurement value is stored;

acquiring a luminance characteristic of a standard display panel;

gradually changing a luminance range for the image on a basis of the measurement value such that the image is displayed within a luminance range of the standard display panel; and outputting data of the image whose luminance range has been adjusted, wherein the acquiring includes at least one of: (i) acquiring a luminance characteristic determined on a basis of measurement values of luminance characteristics of a plurality of display panels, as the luminance characteristic of the standard display panel; and (ii) acquiring a luminance characteristic of a display panel whose maximum luminance is lowest among a plurality of shipped display panels, as the luminance characteristic of the standard display panel.

11. A display controller that controls data of an image to be outputted to a display panel, comprising:

a color gamut information storage unit that stores a measurement value relating to a color gamut of the display panel;

a standard information acquisition unit that acquires information relating to a color gamut of a standard display panel;

a color adjustment unit that adjusts a pixel value of the image on a basis of the measurement value such that a color displayed on the standard display panel is displayed; and an outputting unit that outputs data of the image whose pixel value has been adjusted.

12. The display controller according to claim 11, wherein the color adjustment unit represents a color indicated by the pixel value of the image in a color coordinate system that does not depend upon a display device, and converts the color into a pixel value adopted when the color is displayed on the display panel of an outputting destination.

13. The display controller according to claim 11, wherein the standard information acquisition unit acquires information relating to a color gamut determined on a basis of measurement values relating to color gamuts of a plurality of display panels, as the information relating to the color gamut of the standard display panel.

14. The display controller according to claim 11, wherein the standard information acquisition unit acquires information relating to a color gamut of a display panel whose color gamut is narrowest among a plurality of shipped display panels, as the information relating to the color gamut of the standard display panel.

15. The display controller according to claim 11, wherein the standard information acquisition unit acquires information relating to a color gamut of a display panel used in creation of a content by a content creator, as the information relating to the color gamut of the standard display panel.

16. The display controller according to claim 11, wherein the color gamut information storage unit stores a measurement value of a chromaticity obtained when a predetermined color is displayed on the display panel.

17. The display controller according to claim 16, wherein the color gamut information storage unit stores a value obtained from measurement values at a plurality of locations in the display panel, as the measurement value of the chromaticity.

18. The display controller according to claim 16, wherein the color gamut information storage unit stores a result measured via an eyepiece arranged on a front face of the display panel, as the measurement value of the chromaticity.

19. The display controller according to claim 16, wherein the color gamut information storage unit stores a measurement value of an image displayed through control for reducing color irregularity of the display panel, as the measurement value of the chromaticity.

20. A head-mounted display comprising:

a display controller that controls data of an image to be outputted to a display panel and that includes a color gamut information storage unit that stores a measurement value relating to a color gamut of the display panel, a standard information acquisition unit that acquires information relating to a color gamut of a standard display panel, a color adjustment unit that adjusts a pixel value of the image on a basis of the measurement value such that a color displayed on the standard display panel is displayed, and an outputting unit that outputs data of the image whose pixel value has been adjusted; and the display panel that displays an image whose data is controlled by the display controller.

21. An image displaying method executed by a display controller that controls data of an image to be outputted to a display panel, the image displaying method comprising:

reading out a measurement value relating to a color gamut of the display panel from a memory in which the measurement value is stored;

acquiring information relating to a color gamut of a standard display panel;

adjusting a pixel value of the image on a basis of the measurement value such that a color displayed on the standard display panel is displayed; and outputting data of the image whose pixel value has been adjusted.

22. A non-transitory, computer readable storage medium containing a computer program, which when executed by a computer that controls data of an image to be outputted to a display panel, causes the computer to perform an image displaying method by carrying out actions, comprising:

reading out a measurement value relating to a color gamut of the display panel from a memory in which the measurement value is stored;

acquiring information relating to a color gamut of a standard display panel;

adjusting a pixel value of the image on a basis of the measurement value such that a color displayed on the standard display panel is displayed; and outputting data of the image whose pixel value has been adjusted.

* * * * *